(12) United States Patent
Orderud

(10) Patent No.: US 7,889,912 B2
(45) Date of Patent: *Feb. 15, 2011

(54) METHOD FOR REAL-TIME TRACKING OF CARDIAC STRUCTURES IN 3D ECHOCARDIOGRAPHY

(75) Inventor: Fredrik Orderud, Trondheim (NO)

(73) Assignee: The General Electric Company, Schenectady, NY (US)

(*) Notice: Subject to any disclaimer, the term of this patent is extended or adjusted under 35 U.S.C. 154(b) by 887 days.

This patent is subject to a terminal disclaimer.

(21) Appl. No.: 11/775,903

(22) Filed: Jul. 11, 2007

(65) Prior Publication Data

US 2008/0069436 A1    Mar. 20, 2008

Related U.S. Application Data

(60) Provisional application No. 60/845,082, filed on Sep. 15, 2006.

(51) Int. Cl.
G06K 9/00    (2006.01)

(52) U.S. Cl. .............. 382/154; 382/100; 382/128; 382/224

(58) Field of Classification Search ............. 382/100, 382/128, 224, 154
See application file for complete search history.

(56) References Cited

U.S. PATENT DOCUMENTS

| | | | |
|---|---|---|---|
| 4,489,729 A | 12/1984 | Sorenson et al. | |
| 5,768,413 A | 6/1998 | Levin et al. | |
| 5,797,849 A | 8/1998 | Vesely et al. | |
| 5,806,521 A | 9/1998 | Morimoto et al. | |
| 5,817,022 A | 10/1998 | Vesely | |
| 6,019,725 A | 2/2000 | Vesely et al. | |
| 6,106,464 A | 8/2000 | Bass et al. | |
| 6,295,464 B1 | 9/2001 | Metaxas | |
| 6,352,507 B1 | 3/2002 | Torp et al. | |
| 6,385,332 B1 * | 5/2002 | Zahalka et al. | 382/128 |
| 6,517,485 B2 | 2/2003 | Torp et al. | |

(Continued)

OTHER PUBLICATIONS

Alan H. Barr, "Global and Local Deformations of Solid Primitives", Computer Graphics, vol. 18, No. 3, Jul. 1984, pp. 21-30.

(Continued)

*Primary Examiner*—Bhavesh M Mehta
*Assistant Examiner*—Stephen R Koziol
(74) *Attorney, Agent, or Firm*—Andrus, Sceales, Starke & Sawall, LLP

(57) ABSTRACT

A method for tracking motion and shape changes of a deformable model in a volumetric image sequence. The method is operable to predict the surface of a space from a 3D image, such as cardiac structures from a 3D ultrasound. The shape and position of a deformable model is predicted for each frame of an ultrasound image. Edge detection is then performed for each predicted point on the deformable model perpendicular to the model surface. The distances between the predicted and measured edges for the deformable model are measurements for a Kalman filter. The measurements are coupled with noise values that specify the spatial uncertainty of the edge detection. The measurement data are subsequently summed together in information space and combined with the prediction in the Kalman filter to estimate the position and deformation for the deformable model. The deformable model is then updated to generate an updated surface model.

19 Claims, 5 Drawing Sheets

U.S. PATENT DOCUMENTS

| | | | |
|---|---|---|---|
| 6,638,221 | B2 | 10/2003 | Abe et al. |
| 6,676,599 | B2 | 1/2004 | Torp et al. |
| 6,875,176 | B2 | 4/2005 | Mourad et al. |
| 6,896,657 | B2 | 5/2005 | Willis |
| 6,950,689 | B1 | 9/2005 | Willis et al. |
| 6,968,224 | B2 | 11/2005 | Kessman et al. |
| 7,022,077 | B2 | 4/2006 | Mourad et al. |
| 7,043,063 | B1 | 5/2006 | Noble et al. |
| 7,052,461 | B2 | 5/2006 | Willis |
| 7,077,807 | B2 | 7/2006 | Torp et al. |
| 7,079,674 | B2 * | 7/2006 | Paragios et al. ............. 382/128 |
| 7,110,583 | B2 * | 9/2006 | Yamauchi ................... 382/128 |
| 7,261,694 | B2 | 8/2007 | Torp et al. |
| 7,356,367 | B2 | 4/2008 | Liang et al. |
| 7,366,334 | B2 * | 4/2008 | Yokota et al. ............... 382/128 |
| 7,428,334 | B2 * | 9/2008 | Schoisswohl et al. ....... 382/173 |

OTHER PUBLICATIONS

Andrew Blake et al., "A framework for spatio-temporal control in the tracking of visual contours", Int. J. Computer Vision, 11, 2, 127-145, 1993, pp. 1-34.

Andrew Blake et al., "Learning to track the visual motion of contours", Elsevier Science B.V., Artificial Intelligence 78, 1995, pp. 179-212.

Andrew Blake, "Active Contours", Chapters 1-12, Appendices A-C and Contents, 1998, pp. 1-352.

Dorin Comaniciu et al., "Robust Real-Time Myocardial Border Tracking for Echocardiography: An Information Fusion Approach", IEEE Transactions on Medical Imaging, vol. 23, No. 7, Jul. 2004, pp. 849-860. et al.

A. Franke et al., "Second-generation real-time 3D echocardiography: a revolutionary new technology", MEDICAMUNDI, 47/2, Aug. 2003, pp. 34-40.

Gary Jacob et al., "Evaluating a robust contour tracker on echocardiographic sequences", Medical Image Analysis, vol. 3, No. 3, 1999, pp. 63-75.

Gary Jacob et al., "Quantitative Regional Analysis of Myocardial Wall Motion", Ultrasound in Med. & Biol., vol. 2, No. 6, 2001, pp. 773-784.

Gary Jacob et al., "A Shape-Space-Based Approach to Tracking Myocardial Borders and Quantifying Regional Left-Ventricular Function Applied in Echocardiography", IEEE Transactions on Medical Imaging, vol. 21, No. 3, Mar. 2002, pp. 226-238.

Dimitri Metaxax et al. "Shape and Nonrigid Motion Estimation through Physics-Based Synthesis", IEEE Transactions on Pattern Analysis and Machine Intelligence, vol. 15, No. 6, Jun. 1993, pp. 580-591.

J. Alison Noble et al., "Ultrasound Image Segmentation: A Survey", IEEE Transactions on Medical Imaging, vol. 25, No. 8, Aug. 2006, pp. 987-1010.

Jinah Park et al., "Deformable Models with Parameter Functions for Cardiac Motion Analysis from Tagged MRI Data", IEEE Transactions on Medical Imaging, vol. 15, No. 3, Jun. 1996, pp. 278-289.

Stein Inge Rabben et al., "Semiautomatic Contour Detection in Ultrasound M-Mode Images", Ultrasound in Med. & Biol., vol. 26, No. 2, 2000, pp. 287-296.

Xiang Sean Zhou et al., "An Information Fusion Framework for Robust Shape Tracking", IEEE Transactions on Pattern Analysis and Machine Intelligence, vol. 27, No. 1, Jan. 2005, pp. 115-129.

* cited by examiner

METHOD FOR REAL-TIME TRACKING OF CARDIAC STRUCTURES IN 3D ECHOCARDIOGRAPHY

CROSS REFERENCE TO RELATED APPLICATION(S)

The present application is based on and claims priority to U.S. Provisional Patent Application Ser. No. 60/845,082, filed on Sep. 15, 2006.

FIELD OF THE INVENTION

The subject matter disclosed herein generally relates to a method of tracking 3D structures within image data. More specifically, the subject matter disclosed herein relates to a method of real-time tracking cardiac structures, such as chambers of the heart, in 3D ultrasound images to calculate desired information about the structure in real-time.

BACKGROUND OF THE INVENTION

The emergence of volumetric image acquisition within the field of medical imaging has attracted a large amount of scientific interest in recent years. Many different approaches to segmentation and tracking of deformable models in volumetric datasets have been proposed, including both novel algorithms and extensions of existing algorithms to 3D datasets. The presently known past attempts are, however, limited to offline operation due to the extensive processing requirements of the current methods, even though volumetric acquisition may be performed in real-time with the latest generation of 3D ultrasound technology. Presently, no method for real-time tracking or segmentation of such data is currently available.

The availability of technology for real-time tracking in volumetric datasets would open up possibilities for instant feedback and diagnosis using medical imaging. There is, for instance, a clinical need for real-time monitoring of cardiac function during invasive procedures and intensive care. The automatic tracking of parameters, such as volume, of the main chamber of the heart, the left ventricle (LV), would be one beneficial application of real-time tracking.

Most tracking approaches in 2D echocardiography have been based on traditional deformable models, which facilitate free-form deformation. These methods, however, tend to be too slow for real-time applications and must be initialized close to the LV boundaries. The problem can, however, be made tractable by restricting the allowable deformations to certain predefined modes. This both regularizes the problem to make tracking more robust, and allows for real-time implementations based on sequential state estimation.

This state estimation approach was first presented by Blake et al. *A framework for spatiotemporal control in the tracking of visual contours. International Journal of Computer Vision,* 11(2):127-145, 1993, which taught the use of a Kalman filter to track B-spline models deformed by linear transforms within a model subspace referred to as shape space. Later, the framework was applied for real-time left ventricular tracking in long-axis 2D echocardiography by Jacob et al. *Quantitative regional analysis of myocardial wall motion. Ultrasound in Medicine & Biology,* 27(6):773-784, 2001. All these past methods utilize a B-spline representation, deformed by a trained linear principal component analysis (PCA) deformation model in 2D datasets.

A somewhat similar approach (see D. Metaxas and D. Terzopoulos, *Shape and Nonrigid Motion Estimation Through Physics-Based Synthesis. IEEE Transactions on Pattern Analysis and Machine Intelligence,* 15(6):580-591, 1993) used a continuous Kalman filter to estimate parameters for a deformable superquadric model using 3D positions of points sampled from diode markers attached to objects. This yielded direct 3D measurements at predefined known points. The present disclosure, however, uses edge detection to perform displacement measurements at regularly sampled intervals in proximity to a predicted contour.

BRIEF DESCRIPTION OF THE INVENTION

The present disclosure relates to a method of tracking motion and shape changes of deformable models that are fitted to edges in volumetric image sequences. The method utilizes an extended Kalman filter to estimate the position, orientation and deformation parameters of a deformable model.

The shape and position of the deformable model is first predicted for each new frame, using a kinematic model. Edge detection is then performed in proximity to this model. The edge protection is done by searching for edges perpendicular to the model surface at regularly spaced locations across the model. The determined distances between the predicted and measured edges for the deformable model are treated as measurements to a least squares algorithm, such as a Kalman filter. The distance measurements are coupled with associated measurement noise values, which specify the spatial uncertainty of the local edge detection. Model parameter sensitivities with respect to the edge measurements are calculated for each edge-detection point. The sensitivities are combined with the edge measurements.

All measurement data is subsequently summed together in the information space, and combined with the prediction in a Kalman filter to estimate the position and deformation parameters for the deformable model.

BRIEF DESCRIPTION OF THE DRAWINGS

The drawings illustrate the best mode presently contemplated of carrying out the invention. In the drawings.

DETAILED DESCRIPTION OF THE INVENTION

Figure 1:
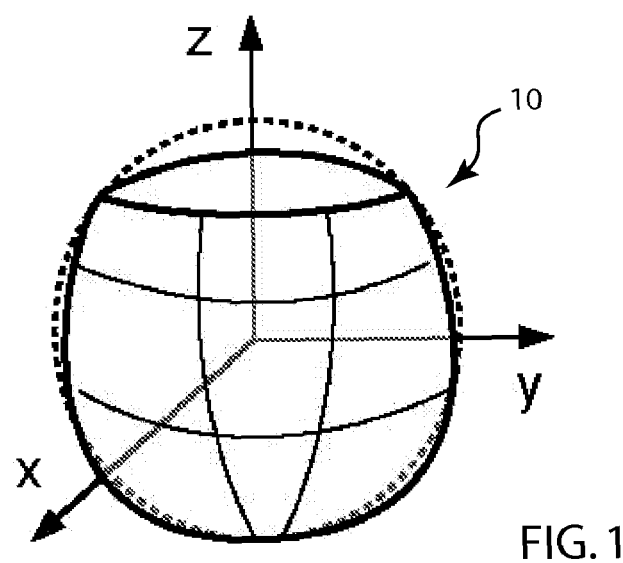
FIG. 1 is a graphical illustration of a truncated spherical contour.

This disclosure presents a tracking approach that allows for real-time tracking of deformable contours with nonlinear modes of deformation in volumetric datasets. The approach of the disclosure treats the tracking problem as a state estimation problem, and uses an extended Kalman filter to recursively track deformation parameters using a combination of state predictions and measurement updates.

A deformable contour model for the left heart ventricle serves as exemplary realization of real-time volumetric tracking in 3D echocardiography. Although a deformable contour model for the left heart ventricle is shown and described in the Figures, it should be understood that the method of the present disclosure could be utilized with other cardiac structures or even other internal structures that can be monitored using imaging techniques. Further, although the present disclosure relates to the use of ultrasound imaging, it is contemplated that various other types of imaging, such as MRI and CT, can be utilized while operating within the scope of the present disclosure. The model shown in the Figures employs a combination of modes for shape and global pose deformations to intuitively model the range of deformations expected from the left ventricle.

Deformable Contour Model

As described above, it is often desirable to track the changing volume of a cardiac chamber, such as the left ventricle, during the monitoring of a patient's heart utilizing an ultrasound device. The first step in the method of the present disclosure requires the cardiac chamber being monitored to first be modelled utilizing a contour model. In the embodiment to be shown and described, the contour model 10 is a truncated sphere, as shown along the x, y and z axes in FIG. 1.

The present method utilizes contour tracking using state estimation algorithms. Contour tracking is a form of sequential object following in video streams, where the focus is on properties of the object boundary, such as gradients and edges, instead of the object interior. This method differs from segmentation-based tracking approaches, also known as blob tracking, which focus on properties of the object interior, such as color or texture.

One advantage of contour tracking compared to segmentation-based tracking is the reduced computational complexity, because only the objects boundary needs to be examined, and not the entire object interior. Contour tracking, however, does require objects with clearly present edges that can be used to detect the presence of an object.

Contour models are used to represent and parameterize contours, and thus act as templates for the objects being tracked. The frameworks for the many forms of contours, such as polygons, quadratic and cubic b-lines, implicit curves and parametric surfaces among others. The only requirement is that it must be possible to evaluate the position and the normal vector of regularly spaced contour points on the contour model.

The tracking framework is based upon on a contour transformation model T which transforms points on a contour shape template $p_0 = [p_{o,x}\ p_{o,y}\ p_{o,y}]^T$ into deformed points $p = [p_x\ p_y\ p_y]^T$, using a state vector x as a parameter according to the following formula:

$$p = T(p_0, x)$$

The above parameterization puts very few restrictions on the allowable deformation, so a wide range of parameterized deformation models can be used, including nonlinear biomechanical models. Although various models can be used, it must be possible to compute all partial derivatives of the point position as a function of the deformation parameters. The transformation of contour normals also requires calculation of the spatial derivatives. This approach differs from the linear shape space deformations used in prior 2D methods, where all deformations had to be linear in the state vector, and hence did not need any partial derivative calculations.

Normal Vector Transformation

The calculation of normal vectors for the various contour points on the surface of the deformed contour model is accomplished by multiplying the transpose of the inverse spatial Jacobian matrix with the initial normal vector, and the determinant of the Jacobian matrix as follows:

$$n = \left| \frac{\partial T(p_0, x)}{\partial p_0} \right|$$

$$\left( \frac{\partial T(p_0, x)}{\partial p_0} \right)^{-T}_{n_0}.$$

The spatial Jacobian matrix of the transformation model is the matrix of the partial derivatives of the transformed contour points with regards to all parameters:

$$\frac{\partial T(p_0, x)}{\partial p_0} = \begin{bmatrix} \frac{\partial p_x}{\partial p_{0,x}} & \frac{\partial p_x}{\partial p_{0,y}} & \frac{\partial p_x}{\partial p_{0,z}} \\ \frac{\partial p_y}{\partial p_{0,x}} & \frac{\partial p_y}{\partial p_{0,y}} & \frac{\partial p_y}{\partial p_{0,z}} \\ \frac{\partial p_z}{\partial p_{0,x}} & \frac{\partial p_z}{\partial p_{0,y}} & \frac{\partial p_z}{\partial p_{0,z}} \end{bmatrix}$$

Exemplary Ellipsoid Model

As described above, when utilizing the method of the present disclosure to monitor and track the left ventricle in an ultrasound image, a truncated spherical contour, such as shown in FIG. 1, is selected to represent the left ventricle. Although a truncated spherical contour is selected as the initial contour model, it should be understood that various other models that generally replicate the shape and size of the left ventricle could be utilized. Additionally, if the method of the present invention is utilized to monitor other cardiac chambers or other organs being monitored, the contour model could be selected to have a vastly different shape.

The truncated sphere can be represented by a set of points defined by the circle equation, with z truncated to values below one using the truncation parameter T:

$$x^2 + y^2 + z^2 = 1, \text{ for } z \in [-1, \sin(T)], T \leq \pi/2$$

$$x^2 + y^2 \leq 1 - \sin^2(T), \text{ for } z = \sin(T)$$

The ellipsoid equation can also be expressed in parametric form, using parameters u and v, for apical-basal movement and short-axis rotation respectively. The value of u is limited to values lower than $\pi/2$. The main contour will then satisfy the following equation:

$$p_0 = \begin{bmatrix} \cos(u)\cos(v) \\ \cos(u)\sin(v) \\ \sin(u) \end{bmatrix} \quad \begin{array}{l} T \leq \pi/2 \\ u \in [-\pi/2, T] \\ v \in [0, 2\pi) \end{array}$$

$$p_0 = \begin{bmatrix} f\cos(T)\cos(v) \\ f\cos(T)\sin(v) \\ \sin(T) \end{bmatrix} \quad \begin{array}{l} f \in [0, 1] \\ v \in [0, 2\pi) \end{array}$$

A nice property of this contour model is that all contour normals, with the exception of the truncation plane, are parallel to the associated point coordinate. A separate model for contour normals is therefore not needed.

Exemplary Transformation Model for the Ellipsoid

Once the contour model for the truncated sphere has been developed, a transformation model for the truncated sphere is defined as consisting of the following parameters:

Translation (tx,ty,tz).
Scaling (sx,sy,sz).
Rotation/orientation (rx,ry).
"Bending" (cx,cy).

In total, this yields a state vector x containing 10 parameters:

$$x=[t_x, t_y, t_z, s_x, s_y, s_z, r_x, r_y, c_x, c_y]^T$$

The proposed transformation model is then defined to be as follows:

$$p = T(p_0, x)$$

$$p = Rot_x(x)Rot_y(x)\text{Scale}(x)\text{Bend}(x, p_0) + \text{Trans}(x)$$

$$\begin{bmatrix} x \\ y \\ z \end{bmatrix} = \begin{bmatrix} 1 & 0 & 0 \\ 0 & \cos(r_x) & \sin(r_x) \\ 0 & -\sin(r_x) & \cos(r_x) \end{bmatrix} \begin{bmatrix} \cos(r_y) & 0 & -\sin(r_y) \\ 0 & 1 & 0 \\ \sin(r_y) & 0 & \cos(r_y) \end{bmatrix} \begin{bmatrix} s_x & 0 & 0 \\ 0 & s_y & 0 \\ 0 & 0 & s_z \end{bmatrix}$$

$$\begin{bmatrix} x_0 + c_x\cos(\pi z_0) \\ y_0 + c_y\cos(\pi z_0) \\ z_0 \end{bmatrix} + \begin{bmatrix} t_x \\ t_y \\ t_z \end{bmatrix}$$

Figure 2:
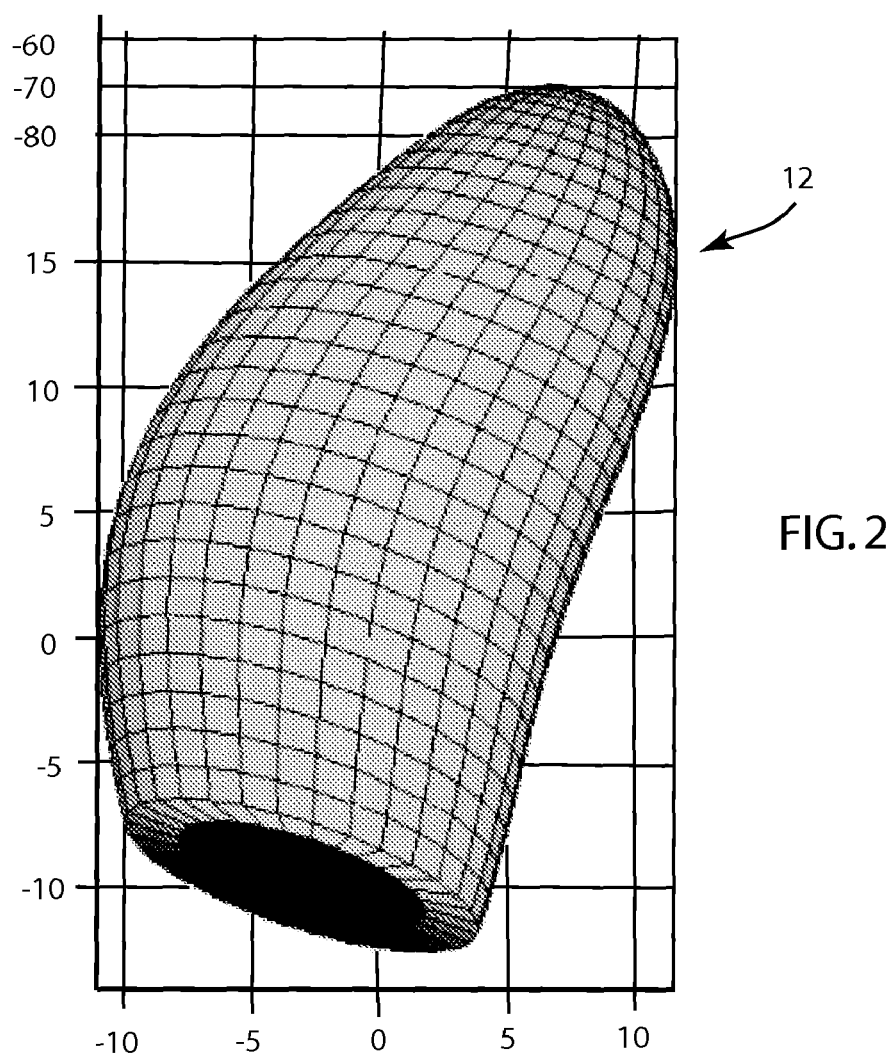
FIG. 2 is an example illustration of the truncated spherical contour as deformed based upon the method of the present disclosure.

Referring now to FIG. 2, thereshown is a deformed ellipsoid contour 12. As can be seen in a comparison of the deformed contour 12 shown in FIG. 2 and the original contour model 10 shown in FIG. 1, the deformed contour 12, which is based upon state vector calculated from prior image frames of the ultrasound imaging, deforms the initial contour model such that the deformed contour model more accurately replicates the actual physical configuration of the cardiac chamber being analyzed, such as the left ventricle.

Based upon the transformation model defined above, Jacobian matrices for spatial and state-space derivatives can be inferred from this function, either by means of numerical evaluation, or by using a computer algebra application to compute closed-form solutions.

Tracking Framework

The contour tracking approach proposed in this disclosure follows a cyclic processing chain consisting of several steps. The main computational steps performed for each new image frame of the ultrasound image can be summarized as follows:

1. Predict a contour model state vector using a kinematic model based upon past image frames.
2. Deform the shape template based on the state vector to form a predicted contour, and compute associated normal vectors and state-space Jacobi matrices.
3. Perform local edge detection along the normal vectors of the predicated contour points of the deformed contour.
4. Assimilate edge measurements in information space.
5. Combine the predicted contour model state vector with edge measurements to compute an updated contour state estimate.

Figure 3:
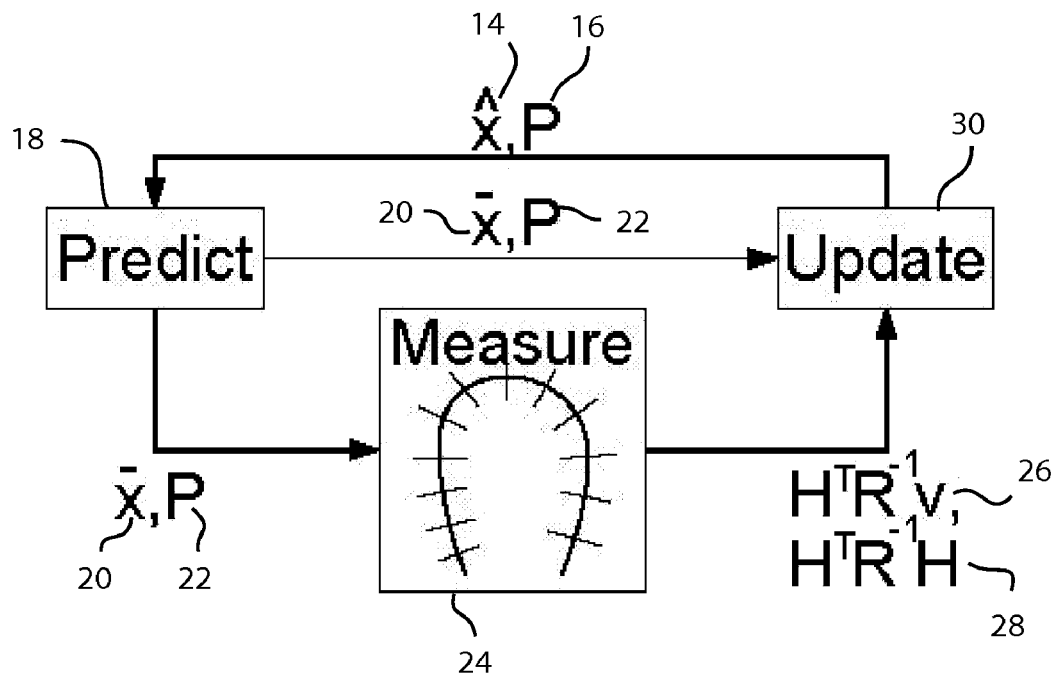
FIG. 3 is a graphical illustration of the overall tracking framework decomposition.

FIG. 3 is a general illustration of the overall tracking decomposition carried out in accordance with the method of the present disclosure. As illustrated in FIG. 3, the state vector 14 and the covariance matrix 16 for the previous image frames are used in the prediction step 18 to create a predicted state vector 20 and a predicted covariance matrix 22. As will be described in detail below, the predicted state vector 20 and covariance matrix 22 are utilized with the measurement step 24 to generate an information vector 26 and an information matrix 28. The information vector 26 and information matrix 28 are utilized in the updating step 30.

State Prediction

Kinematic models are used to predict contour states between successive image frames. Such models act by utilizing prior knowledge, yielding both a prediction for the state vector and the covariance matrix, specifying prediction uncertainty. The prediction can then be used as a starting point for more accurate refinements, called updates, where the prediction is combined with measurements from the current frame to form more accurate estimates.

Most types of video tracking, including contour tracking, deal with moving, deformable objects that are non-stationary both in shape, alignment and position. This adds to the complexity of the state prediction, since simple state estimates from the previous frame do not suffice as inputs for a kinematic model. This is because contour state vectors lack any concept of motion, or rate of change. A strategy for capturing temporal development in addition to the spatial changes is therefore required.

It is desirable to be able to incorporate kinematic properties, such as motion damping, shape and pose regularization for the object being tracked, as well as allowed rate of change for the deformation parameters. Exploitation of these properties may help guide tracking by restricting the search space, which in turn can be used to discard outlier edges and impose temporal coherence for the contour.

Fortunately, the state prediction stage of a Kalman filter provides a framework for such modeling. Modeling of motion in addition to position can be accomplished by augmenting the state vector to contain the last two successive state estimates from the previous two image frames and forming a second order autoregressive model. A kinematic model which predicts state $\bar{x}$ at timestep k+1, with focus on deviation from a mean state $x_0$, can then be expressed as:

$$\bar{x}_{k+1} - x_0 = A_1(\hat{x}_k - x_0) + A_2(\hat{x}_{k-1} - x_0)$$

where $\hat{x}^k$ is the estimated state from timestep k. Tuning of properties like damping and regularization towards the mean state $x_0$ for all deformation parameters can then be accomplished by adjusting the coefficients in matrices $A_1$ and $A_2$. Prediction uncertainty can similarly be adjusted by manipulating the process noise covariance matrix $B_0$ that is used in the associated covariance update equation. The latter will then restrict the rate of which parameter values are allowed to vary.

Alternative kinematic models, including models of higher order, and nonlinear models, may also be used without alterations to the overall framework.

Contour Deformation

Once the predicted state vector x is calculated for the contour model based upon past image frames, the transformation model is used in conjunction with the predicted state vector to create contour points p with associated normal vectors n, based on the predicted state vector, as shown earlier in the disclosure.

Processing of edge measurements using an extended Kalman filter requires the state-space Jacobi matrices to be evaluated at the predicted state vector to relate changes in the contour point positions to changes in the contour state. Separate Jacobian matrices for each contour point must therefore also be calculated, consisting of partial derivatives of contour point with regards to all transformation parameters:

$$\frac{\partial T(p_o, x)}{\partial x} = \begin{bmatrix} \frac{\partial p_x}{\partial x_1} & \frac{\partial p_x}{\partial x_2} & \cdots & \frac{\partial p_x}{\partial x_N} \\ \frac{\partial p_y}{\partial x_1} & \frac{\partial p_y}{\partial x_2} & \cdots & \frac{\partial p_y}{\partial x_N} \\ \frac{\partial p_z}{\partial x_1} & \frac{\partial p_z}{\partial x_2} & \cdots & \frac{\partial p_z}{\partial x_N} \end{bmatrix}.$$

Edge Measurements

Figure 4:
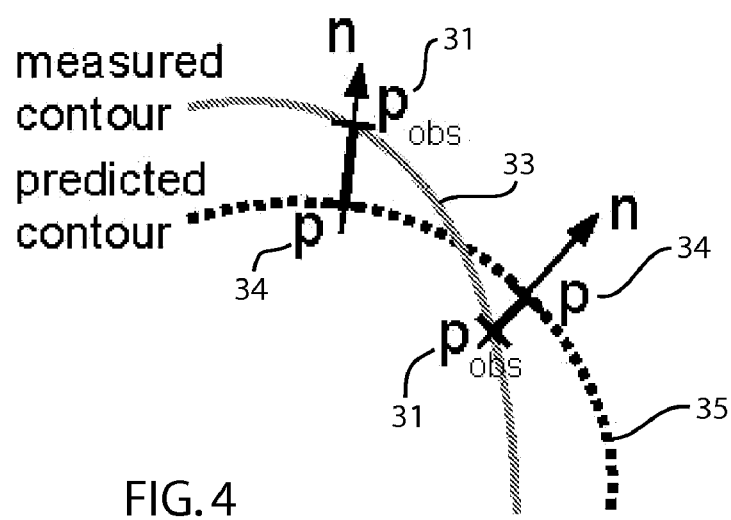
FIG. 4 is a graphical illustration of the normal displacement measurements along the normal vectors of points on a predicted contour.

Once the contour deformation has been created as set forth above, edge detection is carried out to determine the actual position of contour points 31 along the inside wall of the structure 33 being tracked, as shown in FIG. 4. As an example, edge detection is carried out to determine contour points along the inner wall of the left ventricle. Edge detection is the process of detecting the presence and position of edges in an image, such as an ultrasound image. An edge is usually defined to be any significant change in image intensity occurring over a short spatial scale. The strategies for detecting edges are numerous and diverse. The most commonly used procedure is spatial derivative-filtering, a process that enhances any changes in image intensity. Subsequent thresholding will then reveal the position of any edges present. A problem with this approach is that it not only enhances edges, but also noise, which limits the robustness of the method. The present disclosure will therefore utilize different types of edge detection.

Further, the normal approach to edge detection is usually to process the entire image, something that can be computationally demanding since images may include millions of pixels. The contour-tracking approach of the present disclosure does, however, improve the situation, since only contour normals are examined. Processing of the entire image is thus superfluous, opening up for simpler edge detection, where only a few pixels have to be examined for each edge.

In accordance with the present disclosure, it is contemplated that either step edge detection or peak edge detection models may be utilized while operating within the scope of the present disclosure. Further, other edge detection methods are contemplated as being within the scope of the present disclosure.

Edge measurements are used to guide the predicted contour toward the object being tracked. This is done by measuring the distance between the predicted points 34 on the surface of the predicted contour 35 inferred from the kinematic model and actual image edges 33 found by searching in a direction relative to the contour surface, which leads to a displacement measurement n. This type of edge detection performed in the normal direction of the contour surface is referred to as normal displacement. Edge measurements can, however, also be performed by searching in directions other than the normal direction while remaining within the scope of this invention.

The normal displacement between a predicted contour point p with associated normal vector n and a measured edge point $P_{obs}$ is defined to be the normal projection of the distance between the points, as shown in FIG. 4:

$$v = \begin{bmatrix} n_x & n_y & n_z \end{bmatrix} \left( \begin{bmatrix} p_{obs,x} \\ p_{obs,y} \\ p_{pbs,z} \end{bmatrix} - \begin{bmatrix} p_x \\ p_y \\ p_z \end{bmatrix} \right)$$

which on vector form becomes:

$$v = n^T(p_{obs} - p)$$

Each displacement measurement is coupled with a measurement noise r value that specifies the uncertainty associated with the edge, which may either be constant for all edges, or dependent on edge strength or other measure of uncertainty.

This choice of displacement measurements with associated measurements noise enables usage of a wide range of possible edge detectors. The only requirement for the edge detector is that it must identify the most promising edge-candidate for each search normal to the predicted contour point, and assign an uncertainty value to this candidate.

Linearized measurement models, which are required in the Kalman filter for each edge measurement, are constructed by transforming the state-space Jacobi matrices the same way as the edge measurements, namely taking the normal vector projection of them:

$$h^T \equiv n^T \frac{\partial T(p_0, x)}{\partial x}.$$

This yields a separate measurement vector h for each displacement measurement that relates the displacements to changes in contour state.

Measurement Assimilation

Figure 5:
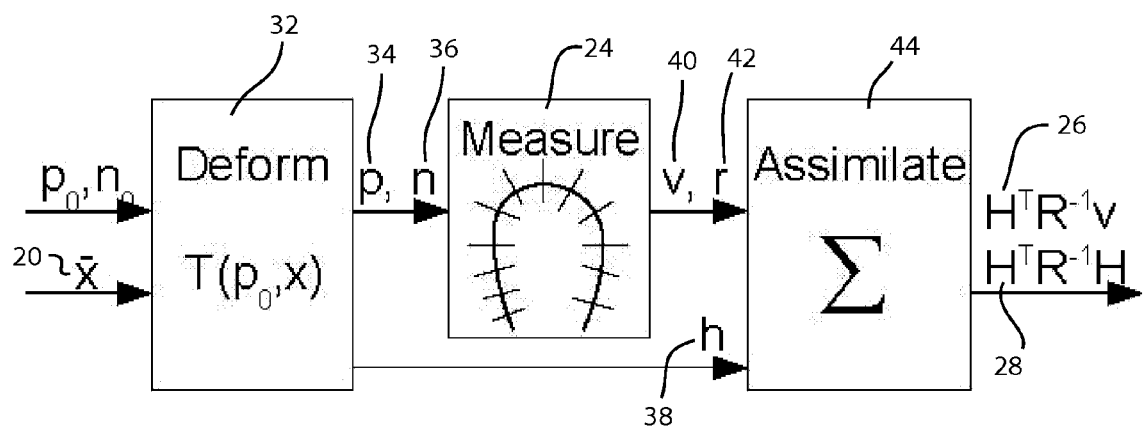
FIG. 5 is a graphical illustration of the steps of the method used to update and track a contour model.

Referring now to FIG. 5, the Figure illustrates the steps of the present disclosure described to this point. As FIG. 5 illustrates, the points on the contour model $p_o$ and $n_o$ are initially deformed using the predicted state vector 20, as illustrated by the deformation step 32. The deformation of the contour model in step 32 utilizes the contour transformation model T to create the predicted contour points 34 and predicted normal vector 36. At the same time, the measurement vector 38 is created that is based upon the state-space Jacobian of the measurement model.

In the measurement step 24, the method determines the position of actual contour points on the current image frame using edge measurement techniques. In the embodiment of the invention shown, the method utilizes 400-600 edge detection points. In a preferred embodiment, the method utilizes 500 edge detection points.

Based upon the measured actual edge detection points, the method then calculates the displacement value v (40) and a measurement noise value r (42).

Once the values and variables are calculated, the method then utilizes an assimilation step 44, which will be described in detail below.

Contour tracking creates a special problem structure, since the number of measurements typically far exceeds the number of state dimensions. In the embodiment described, the system calculates 400-600 contour points for each image frame and the state vector includes ten parameters. Ordinary Kalman gain calculation will then be computationally intractable, since they involve inverting matrices with dimensions equal to the number of measurements (500×500).

An alternative approach avoids this problem by altering the measurement update step in the Kalman filter to accept measurements assimilated in information space prior to the state update step. This is important, since the displacement measurements have to be processed efficiently in order to achieve real-time performance for the contour tracker.

This approach builds upon an assumption of uncorrelated measurements, which in turn allows measurements to be summed efficiently in information space. This is possible because uncorrelated measurements lead to diagonal measurement covariance matrices. All measurement information can then be summed into an information vector and an information matrix of dimensions invariant to the number of measurements. Calculation of an information vector and an information matrix for the measurements are then simplified to become:

$$H^T R^{-1} v = \sum_i h_i r_i^{-1} v_i$$

$$H^T R^{-1} H = \sum_i h_i r_i^{-1} h_i^T$$

Measurement Update

Measurements in information filter form require some alterations to the state update step in the Kalman filter. This can be accomplished by using the information filter formulation of the Kalman filter for the updated state estimate $\hat{x}$ at timestep k:

$$\hat{x}_k = \bar{x}_k + \hat{P}_k H^T R^{-1} v_k$$

The updated error covariance matrix $\hat{P}$ can similarly be calculated in information space to avoid inverting matrices with dimensions larger than the state dimension:

$$\hat{P}_k^{-1} = \bar{P}_k^{-1} + H^T R^{-1} H$$

Once the updated state estimates $\hat{x}$ and the covariance matrix $\hat{P}$ are calculated, these values can then be utilized in the manner described previously to update the contour model. The updated contour model is now based upon measurements taken directly from the current image frame.

Once the contour model has been updated, the updated contour model can be utilized to determine the volume of the area being analyzed. As an example, if the area being analyzed is the left ventricle, the updated contour model can be utilized to determine the volume of the left ventricle during the current image frame from the ultrasound image.

As described above, when using the processing techniques and methods of the present disclosure, an updated contour model can be created for each frame of a continuous imaging technique, such as ultrasound. The processing techniques and methods described above are carried out in the information space using the state vector, which allows the updated contour model to be generated for each individual image frame prior to the generation of the next image frame. This processing method allows the contour model, and various measurement parameters such as volume, to be generated for the 3D area being monitored and tracked. In prior methods and systems, the calculation of volume measurements for areas such as the left ventricle required extensive processing steps after the image frame had been generated. Thus, the method of the present disclosure allows various measurements, such as volume, to be calculated in real time during an ultrasound imaging event.

Figure 6:
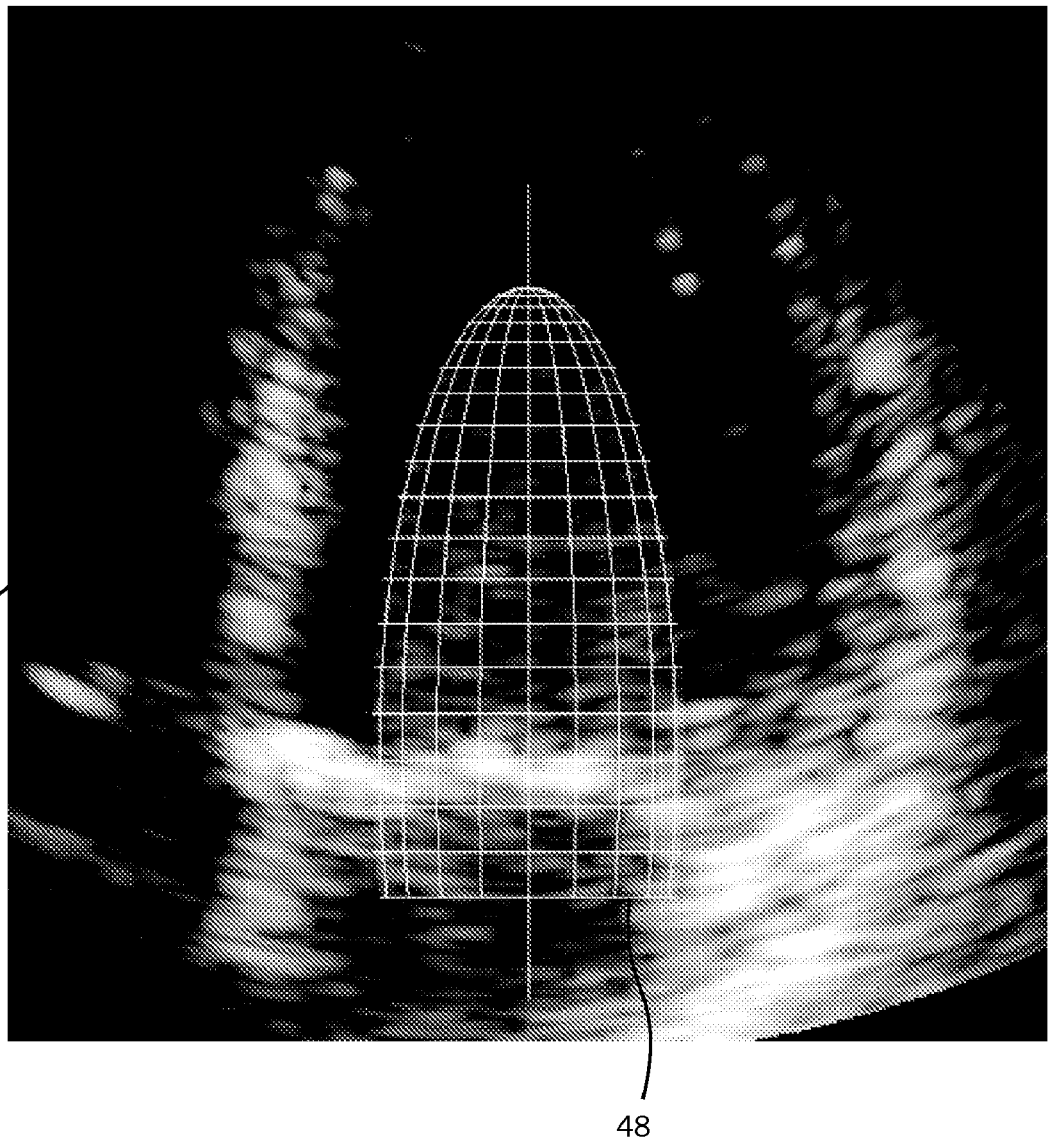
FIG. 6 is a superposition of the contour model over an ultrasound image of the left ventricle before deformation.
Figure 7:
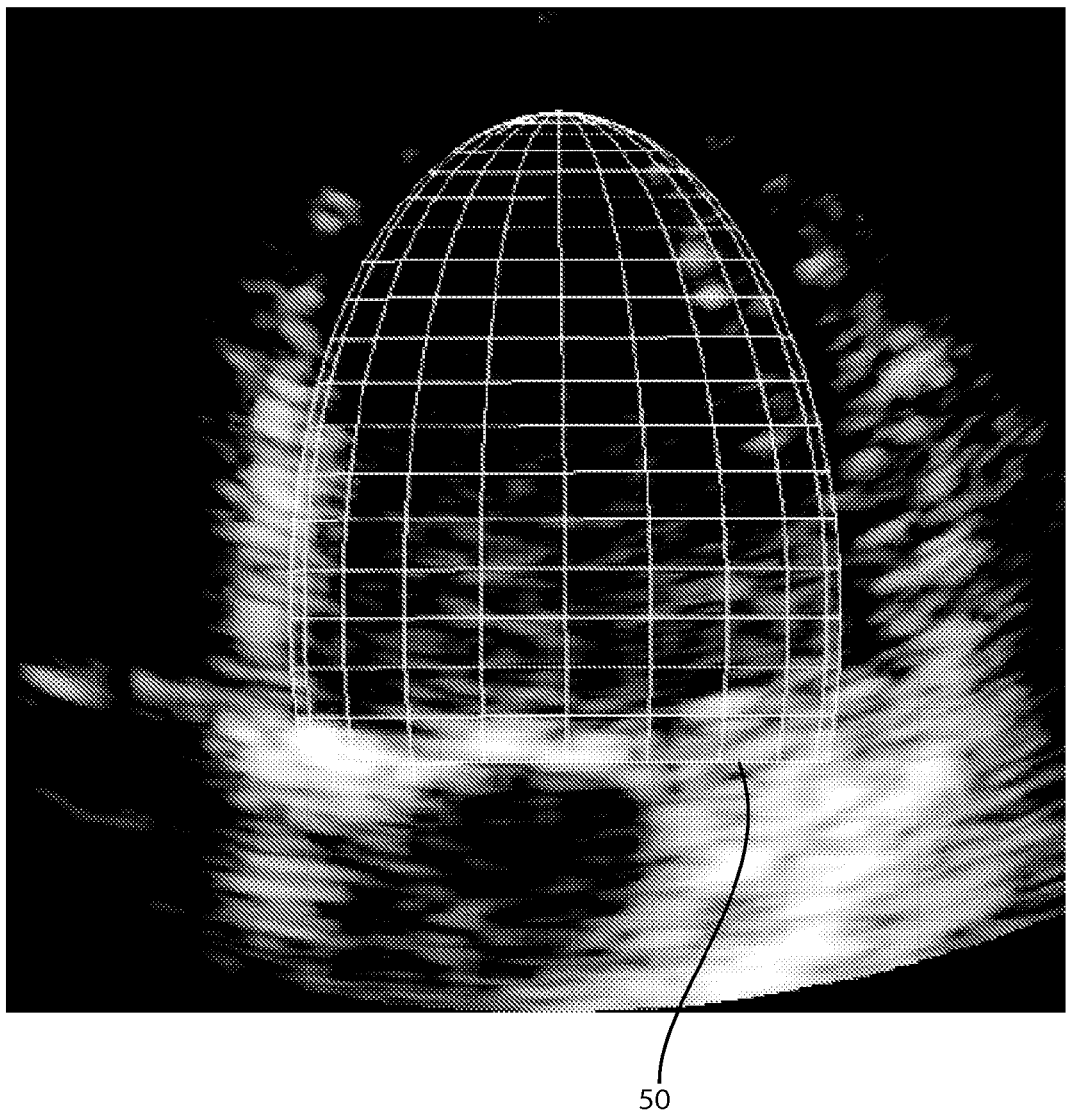
FIG. 7 is a view similar to FIG. 6 illustrating the superposition of the updated, deformed contour model.

Referring now to FIG. 6, thereshown is an example carried out using the method of the present invention. In FIG. 6, an ultrasound image 46 is shown that includes a view of a left ventricle. In accordance with the method of the present disclosure, an initial contour model 48 is shown superimposed over the ultrasound image 46. As can be clearly seen, the dimensions of the contour model 48 do not match the cardiac chamber shown in the ultrasound image.

Following the steps described above, the contour model 48 is updated utilizing information from the previous ultrasound image frames and the updating steps described, including the edge detection methods. Following the updating steps, an updated contour model 50 is developed that more closely matches the size and shape of the cardiac chamber being analyzed.

Once the updated contour model 50 has been developed, the volume of the updated contour model can be easily calculated using conventional algorithms and techniques. The calculated volumes can then be displayed to a user/operator in real-time as the ultrasound image is being monitored.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A method of real-time tracking a 3D structure in a 3D image including a plurality of sequential image frames, the method comprising the steps of:
    selecting a contour model to represent the 3D structure being tracked;
    creating a predicted state vector for the contour model based upon past image frames;
    deforming the contour model based upon the predicted state vector;
    determining a plurality of actual contour points for the 3D structure from a current image frame of 3D image;
    determining a displacement value and a measurement vector based upon the difference between the plurality of actual contour points and a plurality of predicted contour points;
    assimilating the displacement value and the measurement vector in information space utilizing a least squares method to generate an updated state vector and an updated covariance matrix; and
    generating an updated contour model for the current image frame based upon the updated state vector.

2. The method of claim 1 wherein the 3D image is acquired by ultrasound.

3. The method of claim 2 wherein the 3D structure is a cardiac chamber.

4. The method of claim 3 wherein the cardiac chamber is the left ventricle.

5. The method of claim 4 wherein the selected contour model for the left ventricle is a truncated sphere with non-linear modes of deformation.

6. The method of claim 1 further comprising the step of generating the plurality of predicted contour points and a normal vector for each of the predicted contour points based upon the deformed contour model, wherein the displacement value is determined based upon the difference between the actual contour points and the predicted contour points along the normal vector for the predicted contour point.

7. The method of claim 1 wherein the predicted state vector includes a plurality of parameters representing at least translation, scaling, rotation and bending of the contour model.

8. The method of claim 1 wherein the displacement value and the measurement vector are assimilated in information space to create an information vector and an information matrix, wherein the information vector and the information matrix are processed using a Kalman filter to generate the updated state vector and the updated covariance matrix.

9. The method of claim 1 further comprising the step of calculating the volume of the 3D structure based upon the updated contour model before the generation of the next image frame.

10. The method of claim 1 wherein the predicted state vector utilizes the updated state vector determined from the previous two image frames and a kinematic model.

11. A method of determining the surface of a cardiac chamber for the current image frame of a continuous 3D ultrasound image including a plurality of sequential image frames, the method comprising the steps of:

selecting a contour model to represent the cardiac chamber;

creating a predicted state vector for the contour model based upon at least one prior image frame;

deforming the selected contour model based upon the predicted state vector, the deformed contour model having a plurality of predicted contour points;

determining the position of a plurality of actual contour points of the cardiac chamber from the current image frame of the 3D ultrasound;

determining a displacement value and a measurement vector based upon the difference between the plurality of actual contour points and the predicted contour points;

assimilating the displacement value and the measurement vector in information space to generate an updated state vector and an updated covariance matrix;

generating an updated contour model for the current image frame based upon the updated state vector; and calculating the surface of the cardiac chamber based upon the updated contour model.

12. The method of claim 11 wherein the volume of the cardiac chamber for the current image frame is calculated before the generation of the next image frame.

13. The method of claim 11 wherein the cardiac chamber is the left ventricle.

14. The method of claim 13 wherein the selected contour model for the left ventricle is a truncated sphere with non-linear modes of deformation.

15. The method of claim 11 further comprising the step of determining a normal vector for each of the predicted contour points, wherein the displacement value is determined based upon the difference between the actual contour points and the predicted contour points along the normal vector for each of the predicted contour points.

16. The method of claim 11 wherein the predicted state vector is determined by a kinematic model based on estimates from previous frames.

17. The method of claim 16 wherein the predicted state vector for the contour model is based upon two prior image frames.

18. The method of claim 11 wherein the displacement value and the measurement vectors are assimilated in information space to create an information vector and an information matrix, wherein the information vector and the information matrix are processed using a Kalman filter to generate the updated state vector and the updated covariance matrix.

19. The method of claim 11 wherein the displacement value and the measurement vector are processed in information space using a least squares method.

* * * * *

UNITED STATES PATENT AND TRADEMARK OFFICE
CERTIFICATE OF CORRECTION

PATENT NO.        : 7,889,912 B2
APPLICATION NO.   : 11/775903
DATED             : February 15, 2011
INVENTOR(S)       : Orderud Page 1 of 1

It is certified that error appears in the above-identified patent and that said Letters Patent is hereby corrected as shown below:

On Page 2, item (56), under "OTHER PUBLICATIONS", in Column 1, Line 12, after "849-860." delete "et al".

In Column 4, Lines 8-10, delete "$\left(\frac{\partial T(p_0, x)}{\partial p_0}\right)^{-T}_{n_0} \cdot$" and insert -- $\left(\frac{\partial \mathbf{T}(\mathbf{p_0}, \mathbf{x})}{\partial \mathbf{p_0}}\right)^{-T} \mathbf{n_0} \cdot$ --, therefor.

In Column 7, Lines 62-65, delete "$n_z \, ]\!\left(\!\!\begin{bmatrix} p_{obs,x} \\ p_{obs,y} \\ p_{pbs,z} \end{bmatrix}\!\!\right.$" and insert -- $\mathbf{n}_z \, ]\!\left(\!\!\begin{bmatrix} \mathbf{p}_{obs,x} \\ \mathbf{p}_{obs,y} \\ \mathbf{p}_{obs,z} \end{bmatrix}\!\!\right.$ --, therefor.

Signed and Sealed this
Seventeenth Day of May, 2011

David J. Kappos
*Director of the United States Patent and Trademark Office*